(12) United States Patent
Shibata

(10) Patent No.: US 6,226,168 B1
(45) Date of Patent: May 1, 2001

(54) VARIABLE CAPACITOR

(75) Inventor: Yasunobu Shibata, Fukui (JP)

(73) Assignee: Murata Manufacturing Co., Ltd., Nagaokakyo (JP)

(*) Notice: Subject to any disclaimer, the term of this patent is extended or adjusted under 35 U.S.C. 154(b) by 0 days.

(21) Appl. No.: 09/148,902

(22) Filed: Sep. 8, 1998

(30) Foreign Application Priority Data

Sep. 8, 1997 (JP) .................................................. 9-242305

(51) Int. Cl.$^7$ ........................................................ H01G 5/00
(52) U.S. Cl. .................... 361/277; 361/283.1; 361/298.2
(58) Field of Search .................................... 361/277, 278, 361/280, 281, 283.1, 283.2, 287, 290, 291, 292, 293, 294, 298.1, 299.1, 299.2, 299.4, 298.5, 298.2, 298.4; 29/25.42

(56) References Cited

U.S. PATENT DOCUMENTS 4,112,480 * 9/1978 Johanson et al. ..................... 361/271
4,181,923 * 1/1980 Tatsmui et al. ...................... 361/293
5,461,535 * 10/1995 Kishishita et al. ................. 361/298.1

FOREIGN PATENT DOCUMENTS 9-126586  5/1997 (JP).
94-10141  5/1994 (KR).

* cited by examiner

Primary Examiner—Athony Dinkins
(74) Attorney, Agent, or Firm—Burns, Doane, Swecker & Mathis, LLP

(57) ABSTRACT

A variable capacitor includes a stator, a conductive rotor, and a spring-action portion. The rotor electrode projects from the rotor, and a protrusion extends from the rotor as far as the rotor electrode, wherein the protrusion is formed on the rotor in a region other than that where the rotor electrode is formed. The spring-action portion applies a spring force on the rotor so as to press the rotor against the stator. The spring-action portion is formed on a cover around an adjustment hole formed in the cover. The cover allows the rotor to rotate relative to the stator, and the adjustment hole permits the introduction of a tool for rotating the rotor by inserting the tool therethrough. The radial position of the protrusion is selected so as to substantially fall on a circular trajectory which, as the rotor rotates, is swept out on the rotor by a section of the spring-action portion, which section is in contact with the rotor. Thus, even when the rotor is made thinner, a pressing force applied to the rotor by the spring-action portion is less likely to cause rotor deformation.

19 Claims, 2 Drawing Sheets

VARIABLE CAPACITOR

This application corresponds to Japanese Patent Application No. 9-242305, filed on Sep. 8, 1997, which is hereby incorporated by reference in its entirety.

BACKGROUND OF THE INVENTION

1. Field of the Invention:

The present invention relates to a variable capacitor, and particularly to a variable capacitor in which the effective overlapping area between a stator electrode and a rotor electrode is varied through rotation of the rotor electrode relative to the stator electrode to thereby vary capacitance.

2. Description of the Related Art:

One type of variable capacitor is described in Japanese Patent Application No. 9-126586 filed on May 16, 1997 by the applicant of the present invention. FIG. 7 shows a variable capacitor 1 proposed in the application for patent.

Referring to FIG. 7, the variable capacitor 1 is primarily composed of a stator 2, a rotor 3, and a cover 4. A major portion of the stator 2 is formed of a dielectric, such as ceramic. The rotor 3 is formed of a metal, such as brass. The cover 4 is formed of a metal, such as stainless steel or copper alloy.

The above-mentioned elements of the variable capacitor 1 will next be described in detail.

The stator 2 generally has a symmetrical structure. Stator electrodes 5 and 6 are formed side by side in the stator 2. Stator terminals 7 and 8 are formed of a conductive film on the outer surfaces of corresponding end portions of the stator 2 so as to establish electric connection with the stator electrodes 5 and 6, respectively.

A dielectric layer 9 covering the stator electrodes 5 and 6 is formed of a portion of the dielectric that constitutes the stator 2.

As described above, the two stator electrodes 5 and 6 and the two stator terminals 7 and 8 are formed so as to impart a symmetrical structure to the stator 2, so that the orientation of the stator 2 need not be a consideration in the assembly of the variable capacitor 1.

The rotor 3 is placed on the stator 2 so that the rotor 3 comes in contact with the outer surface of the dielectric layer 9. A substantially semicircular rotor electrode 11 projects from the bottom side (as viewed in FIG. 7) of the rotor 3 so as to face the stator electrode 5 (and electrode 6) with the dielectric layer 9 disposed therebetween. FIG. 8 shows a bottom view of the rotor 3.

A protrusion 12 extending out as far as the rotor electrode 11 is also formed on the bottom side of the rotor 3 in a region other than that where the rotor electrode 11 is formed. The protrusion 12 serves to prevent an inclination of the rotor 3 which would otherwise result due to the presence of the rotor electrode 11.

A driver groove 13, which assumes a form of, for example, a square through-hole, is formed in the rotor 3 in order to receive a driver or a like tool used for rotating the rotor 3.

The cover 4 is attached onto the stator 2 while accommodating the rotor 3. The cover 4 allows the rotor 3 to rotate relative to the stator 2. The cover 4 has an adjustment hole 14 formed therein that allows the driver groove 13 to be exposed therethrough. Thus, when the rotor 3 is to be rotated, a driver or a like tool can be inserted into the driver groove 13 through the adjustment hole 14.

The cover 4 has a spring-action portion 15 formed around the adjustment hole 14. The spring-action portion 15 is partially in contact with the upper surface (as viewed in FIG. 7) of the rotor 3 to thereby affect a spring force which presses the rotor 3 against the stator 2. The spring-action portion 15 is formed in such a manner as to incline downward toward the center of the adjustment hole 14, thereby applying a spring force by means of a metallic material present around the adjustment hole 14.

A plurality of protrusions 16 are formed on the spring-action portion 15 at equal intervals along a rotational direction of the rotor 3. These protrusions 16 substantially come into point contact with the rotor 3. These protrusions 16 can be formed through, for example, embossing a metallic plate which constitutes the cover 4.

The cover 4 also has a rotor terminal 17 extending downward (as viewed in FIG. 7).

The variable capacitor 1 including the above-mentioned stator 2, rotor 3, and cover 4 is assembled in the following manner.

The rotor 3 is placed on the stator 2, and then the cover 4 is placed on the stator 2 in such a manner as to cover the rotor 3. Next, the cover 4 is attached onto the stator 2 while being pressed toward the stator 2 so as to press the rotor 3 against the stator 2.

In this case, the rotor terminal 17 integrated with the cover 4 is positioned so as to face the stator terminal 8 provided on the stator 2. In the structure illustrated in FIG. 7, the stator terminal 8 does not function as a stator terminal, and thus no electrical problem will arise.

In the thus-assembled state, the rotor electrode 11 faces the stator electrode 5 with the dielectric layer 9 disposed therebetween to thereby develop capacitance. In order to vary the capacitance through varying the effective overlapping area between the rotor electrode 11 and the stator electrode 5, the rotor 3 is rotated. The capacitance is externally presented between the stator terminal 7 and the rotor terminal 17. The stator terminal 7 is electrically connected to the stator electrode 5. The rotor terminal 17 is integrated with the cover 4, which is in contact with the rotor 3 on which the rotor electrode 11 is formed.

In the variable capacitor 1, the protrusions 16 formed on the spring-action portion 15 of the cover 4 are substantially in point contact with the rotor 3. Accordingly, the positions where the protrusions 16 press against the rotor 3 are reliably fixed. Even when the parallelism of the rotor 3 between the rotor-electrode side and the opposite side is poor or when the flatness of the rotor-electrode side or the opposite side of the rotor 3 or the flatness of a tip portion of the spring-action portion 15 is poor, a contact pressure can be applied in a stable manner to the rotor 3. That is, the above-described variations in machining are effectively "absorbed" in that they do not have an appreciable impact.

Thus, the rotor 3 is uniformly pressed against the stator 2 over the entire surface of the rotor 3. Therefore, the capacitance of the variable capacitor 1 is stabilized and varies smoothly with rotation of the rotor 3. Also, drift in the set position is stabilized, and torque required to rotate the rotor 3 becomes uniform.

When it is desired to make the variable capacitor 1 thinner, this can be effectively accomplished by making the rotor 3 thinner. However, when the rotor 3 is thinned to a thickness of 0.3 mm or less, a pressing force applied to the rotor 3 by the spring-action portion 15 may cause the rotor 3 to deform. Particularly, as in the case of the variable capacitor 1 shown in FIG. 7 in which the protrusions 16 are formed on the spring-action portion 15, the pressing force is applied to the rotor 3 in one or more localized regions. Thus, the rotor 3 is known to be susceptible to deformation. Such an undesirable deformation of the rotor 3 hinders smooth capacitance variation affected through rotation of the rotor 3, typically causing a problem in that the linearity of capacitance variation is impaired, and also rendering the set position (and set capacitance) subject to drift.

SUMMARY OF THE INVENTION

An object of the present invention is to provide a variable capacitor capable of solving at least the above-mentioned problem of undesirable rotor deformation.

The present invention is based in part on the following findings.

In FIG. 7, the dot-and-dash line represents the position of a section of the spring-action portion 15 of the cover 4, which section comes into contact with the rotor 3. More specifically, this line denotes the position of a contact portion 18 of the protrusion 16 formed on the spring-action portion 15, which contact portion 18 comes into contact with the rotor 3. As the rotor 3 rotates, the contact portion 18 sweeps out a circular trajectory 19 on the rotor 3, as represented by the dot-and-dash line in FIG. 8. FIG. 8 is a bottom view of the rotor 3 of FIG. 7. The circular trajectory 19 is a projection on the bottom side of the rotor 3 corresponding to a circular trajectory which is swept out on the upper surface (as viewed in FIG. 7) of the rotor 3 by the contact portion 18.

Referring to FIGS. 7 and 8, the protrusion 12 formed on the bottom side of the rotor 3 is not positioned on the circular trajectory 19, but is positioned outside the circular trajectory 19. Accordingly, a pressing force applied to the rotor 3 by the spring-action portion 15 through the protrusion 16 acts on a portion of the rotor 3 located between the protrusion 12 and the rotor electrode 11, causing the rotor 3 to deform in a flexural manner.

A variable capacitor according to the present invention comprises a stator, a conductive rotor, and a spring-action portion. The stator includes a stator electrode and a dielectric layer formed so as to cover the stator electrode. The rotor is placed on the stator in such a manner as to come into contact with an outer surface of the dielectric layer. A rotor electrode projects from a surface of the rotor facing the outer surface of the dielectric layer so as to face the stator electrode with the dielectric layer disposed therebetween. A protrusion extending out as far as the rotor electrode is formed on the surface of the rotor in a region other than that where the rotor electrode is formed. In order to vary the effective overlapping area between the rotor electrode and the stator electrode, the rotor is held rotatable relative to the stator. The spring-action portion is in contact with a surface of the rotor opposite the surface of the rotor on which the rotor electrode and the protrusion are formed, to thereby apply a spring force which presses the rotor against the stator. In order to solve the previously mentioned problem, the position of the protrusion is selected so as to substantially fall on a circular trajectory which is swept out on the rotor by a section of the spring-action portion which is in contact with the rotor as the rotor rotates.

Since the position of the protrusion substantially falls on the circular trajectory, a pressing force applied to the rotor by the spring-action portion acts on the rotor at a position corresponding to the protrusion.

Accordingly, even when the rotor is made thinner in order to obtain a thin variable capacitor, the flexure of the rotor can be suppressed, which would otherwise result from application of the pressing force applied to the rotor by the spring-action portion. As a result, the capacitance of the variable capacitor can be smoothly varied through rotation of the rotor, and the linearity of capacitance variation is improved, thereby stabilizing drift in the set position.

In the present invention, the protrusion can assume any of various forms. For example, the protrusion can extend in a circular arc form along the above-mentioned circular trajectory. In this case, the protrusion can extend integrally from the rotor electrode, can extend in a continuous circular arc form, or can extend in an intermittent circular arc form. Alternatively, a plurality of protrusions can be formed along the circular trajectory.

When the protrusion extends in a circular arc form along the circular trajectory, the mechanical strength of the rotor can be improved by virtue of a rib effect.

When the protrusion extends integrally from the rotor electrode, the protrusion can be easily formed over a wide angular range along the circular trajectory. Also, when the protrusion extends in a continuous circular arc form, the protrusion can be easily formed over a wide angular range along the circular trajectory. As a result of forming the protrusion over a wide angular range along the circular trajectory, even when the spring-action portion is in intermittent contact with the rotor, the protrusion can be located at a position corresponding to a position of contact between the spring-action portion and the rotor over a wide angular range of rotor rotation. Thus, the protrusion's effect of preventing deformation of the rotor is further enhanced.

When the protrusion extends integrally from the rotor electrode and in a continuous circular arc form, even when the spring-action portion is in intermittent contact with the rotor, either the protrusion or the rotor electrode can be located at a position corresponding to a position of contact between the spring-action portion and the rotor over the entire range of rotor rotation. In terms of prevention of rotor deformation, this form of the protrusion is also effective.

When the protrusion extends in an intermittent circular arc form or is formed by a plurality of protrusions arranged along the circular trajectory, the area of contact between the protrusions and the dielectric layer can be reduced, thereby preventing an undesirable increase in the minimum capacitance of the variable capacitor.

Preferably, the variable capacitor further comprises a cover shaped so as to accommodate and hold the rotor rotatable relative to the stator. An adjustment hole is formed in the cover so as to receive a tool for rotating the rotor. The spring-action portion is formed around the adjustment hole.

When the present invention is applied to a variable capacitor having the above-described structure, one objective of the invention, e.g., decreasing the thickness of the rotor while preventing an undesirable deformation of the rotor, can be achieved more effectively, because the above-described structure is effective in allowing the thickness of the variable capacitor to be reduced.

Further, preferably the spring-action portion has a protrusion which substantially comes into point contact with the rotor. Still further, preferably the spring-action portion has at least the three protrusions arranged along a rotational direction of the rotor.

Point contact between the spring-action portion and the rotor causes the spring-action portion to apply a pressing force to the rotor only in a limited region. As a result, the pressing force would be likely to cause the rotor to deform, if it were not for the above-described protrusion. Such a point-contact protrusion is advantageous because it affects stable spring force on the rotor with a resultant establishment of stable contact between the rotor and the stator.

Also, when at least the three protrusions are formed on the spring-action portion along a rotational direction of the rotor, the state of contact between the protrusions and the rotor is more stabilized. Thus, the above-mentioned effect of the present invention is exhibited further significantly.

BRIEF DESCRIPTION OF THE DRAWINGS

The foregoing, and other, objects, features and advantages of the present invention will be more readily understood upon reading the following detailed description in conjunction with the drawings in which.

DESCRIPTION OF THE PREFERRED EMBODIMENTS

Embodiments of the present invention will next be described with reference to the drawings. Like reference numbers designate like or similar features.

Figure 1:
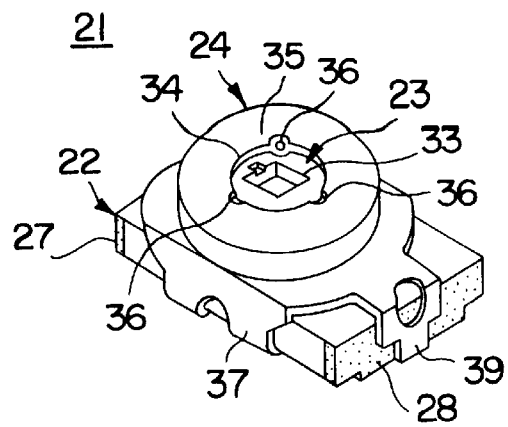
FIG. 1 is a perspective view showing a variable capacitor according to a first exemplary embodiment of the present invention.
Figure 2:
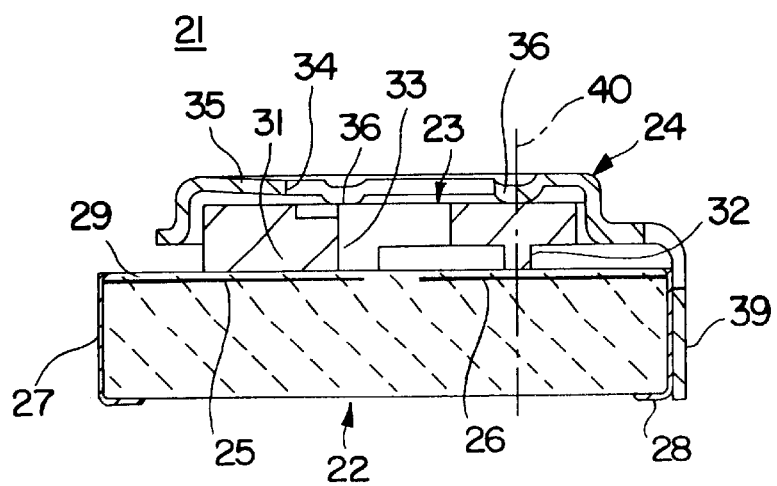
FIG. 2 is a sectional view of the variable capacitor of FIG. 1.
Figure 3:
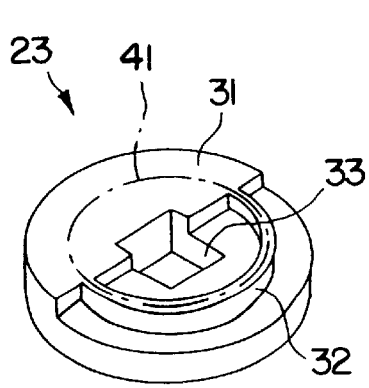
FIG. 3 is a perspective bottom view showing a rotor used in the variable capacitor of FIG. 1.

FIGS. 1 to 3 illustrate a variable capacitor 21 according to a first exemplary embodiment. FIG. 1 is a perspective view of the variable capacitor 21. FIG. 2 is a sectional view of the variable capacitor 21 of FIG. 1.

The variable capacitor 21 is primarily composed of a stator 22, a rotor 23, and a cover 24. FIG. 3 shows a perspective bottom view of the rotor 23. A major portion of the stator 22 is formed of a dielectric, such as ceramic. The rotor 23 is formed of a metal, such as copper alloy or the like. The cover 24 is formed of a metal, such as stainless steel or copper alloy or the like, and can be surface-treated with solder, tin, silver, or a like metal at appropriate portion (s) in order to improve solderability.

The above-mentioned elements of the variable capacitor 21 will next be described in greater detail.

The stator 22 generally has a symmetrical structure. Stator electrodes 25 and 26 are formed side by side in the stator 22. Stator terminals 27 and 28 are formed of a conductive film on the outer surfaces of corresponding end portions of the stator 22 so as to establish electrical connection with the stator electrodes 25 and 26, respectively.

A dielectric layer 29 covering the stator electrodes 25 and 26 is formed by a portion of the dielectric that constitutes the stator 22.

As described above, the two stator electrodes 25 and 26 and the two stator terminals 27 and 28 are formed so as to impart a symmetrical structure to the stator 22, so that the orientation of the stator 22 is not a consideration in the assembly of the variable capacitor 21. If such a feature is not beneficial for a particular application, either the stator electrode 25 or the stator electrode 26 and the associated stator terminal 27 or 28 can be omitted.

The rotor 23 is placed on the stator 22 in such a manner as to come into contact with the outer surface of the dielectric layer 29. As shown in FIG. 3, a substantially semicircular rotor electrode 31 projects from the bottom side (as viewed in FIG. 1) of the rotor 23 so as to face the stator electrode 25 (or electrode 26) with the dielectric layer 29 disposed therebetween.

A protrusion 32 extending out as far as the rotor electrode 31 is also formed on the bottom side of the rotor 23 in a region other than that where the rotor electrode 31 is formed. The protrusion 32 serves to prevent an inclination of the rotor 23 which would otherwise result due to the presence of the extended rotor electrode 31. In the present embodiment, the protrusion 32 extends integrally from the rotor electrode 31 in a circular arc form or substantially circular form. The position of the protrusion 32 will be described later.

A driver groove 33 is formed in the rotor 23 in order to receive a driver or a like tool used for rotating the rotor 23. In the present embodiment, the driver groove 33 assumes the exemplary form of a square through-hole.

The cover 24 is attached onto the stator 22 while accommodating the rotor 23. The cover 24 holds the rotor 23 so that the rotor 23 can be rotated relative to the stator 22. The cover 24 has an adjustment hole 34 formed therein that allows the driver groove 33 to be exposed therethrough. Thus, when the rotor 23 is to be rotated, a driver or a like tool can be inserted into the driver groove 33 through the adjustment hole 34.

The cover 24 has a spring-action portion 35 formed around the adjustment hole 34. The spring-action portion 35 is in contact with the rotor 23 to thereby press the rotor 23 against the stator 22. The spring-action portion 35 is formed in such a manner as to incline downward (as viewed in FIG. 2) toward the center of the adjustment hole 34, thereby affecting a spring force by means of a metallic material present around the adjustment hole 34.

A plurality of protrusions 36 are formed on the spring-action portion 35 and substantially form point contacts with the rotor 23. In the present embodiment, three protrusions 36 are formed along a rotational direction of the rotor 23, preferably at equal intervals. These protrusions 36 can be formed through, for example, embossing a metallic plate which constitutes the cover 24.

The cover 24 has a pair of engagement pieces 37 extending downward (as viewed in FIG. 1, wherein one engagement piece 37 is invisible in FIG. 1) and facing each other. The engagement pieces 37 are bent inward in the variable capacitor assembly procedure, which will be described later, so as to engage the stator 22 at its bottom surface (as viewed in FIG. 1).

Also, the cover 24 has a rotor terminal 39 extending downward (as viewed in FIG. 1) at a position different from the positions of the engagement pieces 37.

The variable capacitor 21 including the above-mentioned stator 22, rotor 23, and cover 24, is assembled in the following manner.

The rotor 23 is placed on the stator 22, and then the cover 24 is placed on the stator 22 in such a manner as to cover the rotor 23. Next, while the cover 24 is pressed toward the stator 22 so as to press the rotor 23 against the stator 22, the engagement pieces 37 of the cover 24 are bent inward to thereby engage with the stator 22 at its bottom surface (as viewed in FIG. 1).

In this case, the rotor terminal 39 integrated with the cover 24 is positioned to face the stator terminal 28 provided on the stator 22 (in the illustrated embodiment of FIGS. 1 and 2, the stator terminal 28 does not function as a stator terminal). Accordingly, the rotor terminal 39 and the stator terminal 28 can be soldered together (not illustrated) to thereby enhance the adhesion of the cover 24 onto the stator 22 and to make the stator terminal 28 serve as a rotor terminal.

Thus, the variable capacitor 21 is assembled in the above-described manner.

In the thus-assembled state, as shown in FIG. 2, the rotor electrode 31 faces the stator electrode 25 with the dielectric layer 29 disposed therebetween to thereby develop capacitance. In order to vary the capacitance through varying the effective overlapping area between the rotor electrode 31 and the stator electrode 25, the rotor 23 is rotated. This capacitance can be externally tapped between the stator terminal 27 and the rotor terminal 39. The stator terminal 27 is electrically connected to the stator electrode 25. The rotor terminal 39 is integrated with the cover 24 which is in contact with the rotor 23 on which the rotor electrode 31 is formed.

In the assembled variable capacitor 21, by means of the protrusions 36 formed on the spring-action portion 35 of the cover 24, the spring-action portion 35 can apply a stable spring force to the rotor 23. Accordingly, stable contact is established between the rotor 23 and the stator 22. That is, the protrusions 36 are in contact with the rotor 23 at fixed positions. As a result, even when the parallelism of the rotor 23 between the rotor-electrode side and the opposite side is poor or when the flatness of the rotor-electrode side or the opposite side of the rotor 23 or the flatness of a tip portion of the spring-action portion 35 is poor, the protrusions 36 press the rotor 23 at reliably fixed positions. That is, variations in machining are effectively "absorbed," since these variations do not affect the performance of the variable capacitor.

Thus, the rotor 23 is uniformly pressed against the stator 22 over the entire surface of the rotor 23. Therefore, the capacitance of the variable capacitor 21 is stabilized and varies smoothly with rotation of the rotor 23, setting drift is stabilized, and torque required to rotate the rotor 23 becomes uniform.

Since the protrusions 36 substantially come into point contact with the rotor 23, the area of contact between the protrusions 36 and the rotor 23 becomes relatively small, thereby increasing an apparent load of contact between the protrusions 36 and the rotor 23. Accordingly, at the contact portions, adhesive wear is apt to occur, resulting in an increase in frictional resistance. Thus, torque required to rotate the rotor 23 can be increased, thereby stabilizing drift in the setting position.

Figure 8:
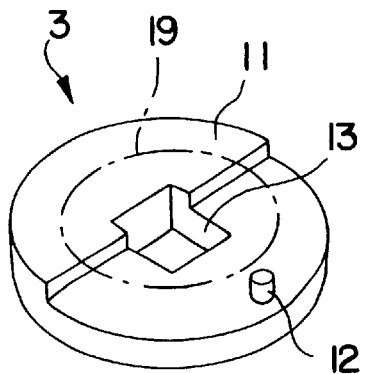
FIG. 8 is a perspective bottom view showing a rotor used in the variable capacitor of FIG. 7.

In FIG. 2, the dot-and-dash line represents the position of a section of the spring-action portion 35 of the cover 24, which section comes into contact with the rotor 23. More specifically, the line denotes the position of a contact portion 40 of the protrusion 36 formed on the spring-action portion 35, which contact portion 40 comes into contact with the rotor 23. As the rotor 23 rotates, the contact portion 40 sweeps out a circular trajectory 41 on the rotor 23 as represented by the dot-and-dash line in FIG. 3. As in the case of FIG. 8 described previously, FIG. 3 is a bottom view of the rotor 23 of FIG. 1. The circular trajectory 41 is a projection on the bottom side of the rotor 23 of a circular trajectory which is swept out on the upper surface (as viewed in FIG. 1) of the rotor 23 by the contact portion 40.

Figure 7:
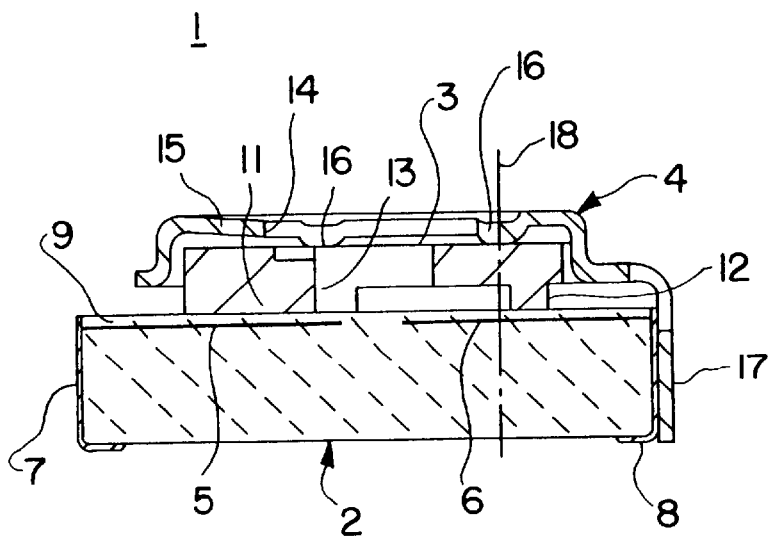
FIG. 7 is a sectional view showing a variable capacitor for use in comparison with the present invention.

Referring to FIGS. 2 and 3, the position of the protrusion 32 formed on the lower surface of the rotor 23 is selected so as to be substantially aligned with the circular trajectory 41 which, as the rotor 23 rotates, is swept out on the rotor 23 by the contact portion 40 of the protrusion 36. Accordingly, a pressing force applied to the rotor 23 by the spring-action portion 35 through the protrusions 36 acts on the rotor 23 at a position corresponding to the protrusion 32. That is, the force applied by the protrusion 36 via the spring-action portion 35 is directly opposed by the protrusion 32, since these protrusions are aligned. Thus, the applied pressing force does not cause the rotor 23 to deform in a flexural manner, unlike the embodiments described with reference to FIGS. 7 and 8.

In the above-described first embodiment, the protrusion 32 extends integrally from the rotor electrode 31 and along the circular trajectory 41 in a continuous circular arc form. The form of the protrusion 32 is not limited thereto, but can be modified in various ways, as exemplified by the following discussion.

Figure 4:
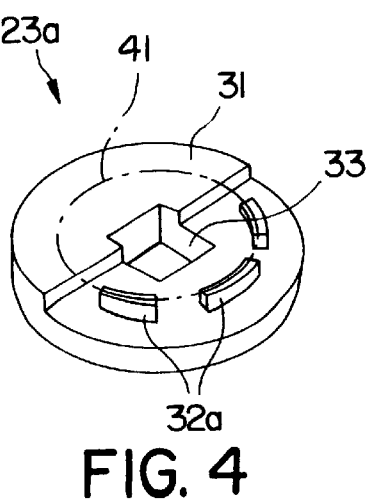
FIG. 4 is a perspective bottom view showing a rotor used in a variable capacitor according to a second exemplary embodiment of the present invention.
Figure 5:
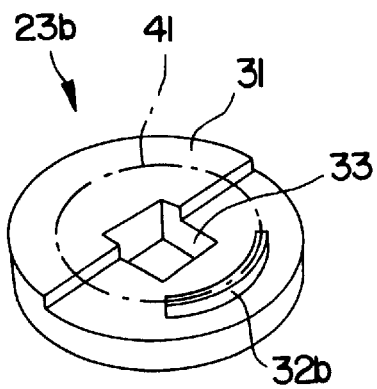
FIG. 5 is a perspective bottom view showing a rotor used in a variable capacitor according to a third exemplary embodiment of the present invention.
Figure 6:
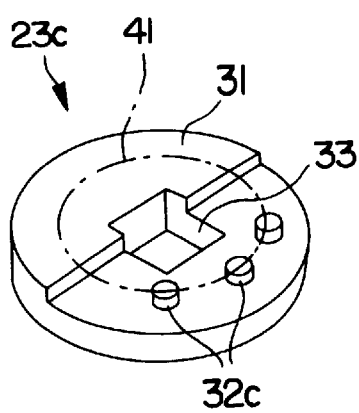
FIG. 6 is a perspective bottom view showing a rotor used in a variable capacitor according to a fourth exemplary embodiment of the present invention.

FIGS. 4 to 6 show rotors used in variable capacitors according to second through fourth embodiments, respectively, of the present invention, and can be used in the variable capacitor design shown in FIG. 3. That is, the rotors shown in FIGS. 4 to 6 can replace the rotor 23 of FIG. 3 used in the variable capacitor 21 shown in FIGS. 1 and 2. In FIGS. 4 to 6, the same features as those in FIG. 3 are denoted by common reference numerals, and their description will be omitted to avoid redundancy.

In FIG. 4, a protrusion 32a formed on a rotor 23a extends along the circular trajectory 41 in a circular arc form, but is divided at intermediate positions along its length. In the embodiment of FIG. 4, the protrusion 32a is divided at two positions so as form a protrusion having three portions.

The number of divisions of the protrusion 32a can be modified as desired. Also, an end division of the protrusion 32a can be extended integrally from the rotor electrode 31.

In FIG. 5, a protrusion 32b formed on a rotor 23b extends along the circular trajectory 41 in a continuous circular arc form, but its ends are separated from the rotor electrode 31. One end or both ends can be separated from the rotor electrode 31. Further, the arc length and position of the protrusion 32b can be modified as desired.

In FIG. 6, a plurality of protrusions 32c are formed on the rotor 23c along the circular trajectory 41. The number, arrangement, and shape of the protrusions 32c can be modified as desired.

Also, two or more of the embodiments of FIGS. 4 to 6 can be combined to obtain some hybrid of the embodiments shown in FIGS. 4 to 6.

Various exemplary forms of the protrusion are described above, but it should be noted that the presence of the protrusion causes an increase in the minimum capacitance of the variable capacitor 21. Thus, the protrusions 32, 32a, 32b, and 32c preferably have a small area of contact with the dielectric layer 29. Accordingly, according to one exemplary embodiment, the width of the protrusions 32, 32a, and 32b is made as narrow as possible, and the diameter of the protrusions 32c is made as small as possible. Also, as in the case of the protrusions 32a, 32b, and 32c, through use of a protrusion extending intermittently, not continuously, along the circular trajectory 41 in a region other than that where the rotor electrode 31 is formed, the minimum capacitance is effectively reduced.

Elements other than the rotor used in the present invention may be modified as desired, and the present invention is not limited to the particular type of variable capacitor discussed above.

For example, to provide stable contact with the rotor 23, it is preferable that three or more protrusions 36 be arranged along a rotational direction of the rotor 23. However, the number of the protrusions 36 can be one, two, or more than three.

Also, a cover can be used having a spring-action portion on which such a protrusion is not formed.

In the above-described embodiments, being formed of a metal, the cover 24 and the rotor 23 serve as conductive passages for connecting the rotor electrode 31 to an external circuit through the rotor terminal 39 formed integrally with the cover 24. However, the cover 24 and the rotor 23 are not structurally limited to this embodiment. For example, the entire rotor need not be formed of metal. The rotor can be formed of an electrical insulating material such as alumina or like material, and only a portion of the rotor is formed of a conductor (e.g., only a portion required to establish the necessary electrical connection). In this case, at least a surface of the protrusion which comes into contact with the dielectric layer is left as an electrical insulator, so that the minimum capacitance is effectively reduced. Further, when the rotor is formed of a metal, at least a surface of the protrusion which comes into contact with the dielectric layer may be coated with an insulator.

Also, the entire cover need not be formed of metal. The cover can be formed of an electrical insulator such as resin, and a portion of the cover can be formed of a conductor (e.g., only a portion required to establish the necessary electrical connection). Further, a conductive passage for connecting the rotor electrode to an external circuit can be formed on a portion other than the rotor or cover. In this case, the rotor or cover is not necessarily formed of metal, either entirely or partially.

Further, the spring-action portion can be provided by a member other than the cover, for example, by a washer-like member having a spring-like property. In this case, the present invention can be applied to a variable capacitor without a cover so long as the rotor is held rotatably without the use of a cover.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A variable capacitor comprising:
   a stator having a stator electrode and a dielectric layer which covers the stator electrode;
   a rotor placed on an outer surface of the dielectric layer of said stator, said rotor having a rotor electrode and a first protrusion, said rotor electrode projecting out from a surface of said rotor, the surface of the rotor facing the outer surface of the dielectric layer so as to face the stator electrode with the dielectric layer disposed therebetween, said first protrusion extending out from the surface of the rotor as far as the rotor electrode in a region on the surface of the rotor other than that where the rotor electrode is formed, said rotor being held rotatable relative to the stator in order to vary an effective overlapping area between the rotor electrode and the stator electrode; and
   a spring-action portion having a second protrusion in point contact with a surface of said rotor opposite the surface of said rotor on which the rotor electrode and said first protrusion are formed, to thereby apply spring forces which press said rotor against said stator,
   wherein a position of said first protrusion is selected so as to fall on a circular trajectory swept out by said second protrusion as said rotor rotates.

2. A variable capacitor according to any of claim 1, further comprising a cover shaped so as to accommodate and hold said rotor rotatable relative to said stator, wherein an adjustment hole is formed in said cover so as to receive a tool for rotating said rotor, and said spring-action portion is formed around the adjustment hole.

3. A variable capacitor according to claim 1, wherein said spring-action portion has at least three protrusions arranged along a rotational direction of said rotor.

4. A variable capacitor according to claim 1, further including a first and second stator terminals disposed on first and second end sections of said stator, wherein said stator electrode is electrically connected to said first stator terminal, and said rotor is electrically connected to said second stator terminal.

5. A variable capacitor according to claim 4, further including a cover having an extended terminal integrally formed therewith, wherein said cover is electrically connected to said rotor, and said extended terminal is electrically connected to said second stator terminal.

6. A variable capacitor comprising:
   a stator having a stator electrode and a dielectric layer which covers the stator electrode;
   a rotor placed on an outer surface of the dielectric layer of said stator, said rotor having a rotor electrode and a protrusion, said rotor electrode projecting out from a surface of said rotor, the surface of the rotor facing the outer surface of the dielectric layer so as to face the stator electrode with the dielectric layer disposed therebetween, said protrusion extending out from the surface of the rotor as far as the rotor electrode in a region on the surface of the rotor other than that where the rotor electrode is formed, said rotor being held rotatable relative to the stator in order to vary an effective overlapping area between the rotor electrode and the stator electrode; and
   a spring-action portion in contact with a surface of said rotor opposite the surface of said rotor on which the rotor electrode and the protrusion are formed, to thereby apply spring forces which press said rotor against said stator,
   wherein a position of the protrusion is selected so as to fall on a circular trajectory swept out by a section of said spring-action portion as said rotor rotates, and wherein the section is in contact with said rotor, and wherein said protrusion extends in a circular arc form along the circular trajectory.

7. A variable capacitor according to claim 6, wherein said protrusion extends integrally from the rotor electrode.

8. A variable capacitor according to claim 6, wherein said protrusion extends in a continuous circular arc form.

9. A variable capacitor according to claim 6, wherein said protrusion is divided into sections with spaces formed between the sections, such that said protrusion extends in an intermittent circular arc form.

10. A variable capacitor comprising:
a stator having a stator electrode and a dielectric layer which covers the stator electrode;
a rotor placed on an outer surface of the dielectric layer of said stator, said rotor having a rotor electrode and a protrusion, said rotor electrode projecting out from a surface of said rotor, the surface of the rotor facing the outer surface of the dielectric layer so as to face the stator electrode with the dielectric layer disposed therebetween, said protrusion extending out from the surface of the rotor as far as the rotor electrode in a region on the surface of the rotor other than that where the rotor electrode is formed, said rotor being held rotatable relative to the stator in order to vary an effective overlapping area between the rotor electrode and the stator electrode; and
a spring-action portion in contact with a surface of said rotor opposite the surface of said rotor on which the rotor electrode and the protrusion are formed, to thereby apply spring forces which press said rotor against said stator,
wherein a position of the protrusion is selected so as to fall on a circular trajectory swept out by a section of said spring-action portion as said rotor rotates, and wherein the section is in contact with said rotor, and wherein said protrusion is formed of a plurality of protrusions arranged along the circular trajectory.

11. A variable capacitor comprising:
a stator having a stator electrode and a dielectric layer;
a rotor having:
a rotor electrode which extends from a first portion of a surface of said rotor; and
a first protrusion which extends from a second portion of said surface of said rotor;
wherein said rotor is placed on said stator such that said dielectric layer separates said stator electrode from said rotor electrode; and
a spring portion having one or more second protrusions, the one or more second protrusions respectively applying one or more forces at one or more discrete points on said rotor and pressing said rotor against said stator, wherein said protrusion is positioned at a location such that said first protrusion opposes said one or more forces as said rotor is rotated, to thereby reduce deformation of said rotor.

12. A variable capacitor according to any of claim 11, further comprising a cover shaped so as to accommodate and hold said rotor rotatable relative to said stator, wherein an adjustment hole is formed in said cover so as to receive a tool for rotating said rotor, and said spring portion is formed around the adjustment hole.

13. A variable capacitor according to claim 11, further including a first and second stator terminals disposed on first and second end sections of said stator, wherein said stator electrode is electrically connected to said first stator terminal, and said rotor is electrically connected to said second stator terminal.

14. A variable capacitor according to claim 13, further including a cover having an extended terminal integrally formed therewith, wherein said cover is electrically connected to said rotor, and said extended terminal is electrically connected to said second stator terminal.

15. A variable capacitor comprising:
a stator having a stator electrode and a dielectric layer;
a rotor having:
a rotor electrode which extends from a first portion of a surface of said rotor; and
a protrusion which extends from a second portion of said surface of said rotor;
wherein said rotor is placed on said stator such that said dielectric layer separates said stator electrode from said rotor electrode; and
a spring portion which applies a force which presses said rotor against said stator, wherein said protrusion is positioned at a location such that said protrusion directly opposes said force as said rotor is rotated, to thereby reduce deformation of said rotor, an wherein said protrusion extends in a circular arc form along a circular trajectory defined by said spring portion as said rotor rotates.

16. A variable capacitor according to claim 15, wherein said protrusion extends integrally from the rotor electrode.

17. A variable capacitor according to claim 15, wherein said protrusion extends in a continuous circular arc form.

18. A variable capacitor according to claim 15, wherein said protrusion is divided into sections with spaces formed between the sections, such that said protrusion extends in an intermittent circular arc form.

19. A variable capacitor comprising:
a stator having a stator electrode and a dielectric layer;
a rotor having:
a rotor electrode which extends from a first portion of a surface of said rotor; and
a protrusion which extends from a second portion of said surface of said rotor;
wherein said rotor is placed on said stator such that said dielectric layer separates said stator electrode from said rotor electrode; and
a spring portion which applies a force which presses said rotor against said stator, wherein said protrusion is positioned at a location such that said protrusion directly opposes said force as said rotor is rotated, to thereby reduce deformation of said rotor, and wherein said protrusion is formed of a plurality of protrusions arranged along the circular trajectory.

* * * * *